United States Patent
Wu (10) Patent No.: US 11,295,760 B2
(45) Date of Patent: Apr. 5, 2022

(54) METHOD, APPARATUS, SYSTEM AND STORAGE MEDIUM FOR IMPLEMENTING A FAR-FIELD SPEECH FUNCTION

(71) Applicant: BAIDU ONLINE NETWORK TECHNOLOGY (BEIJING) CO., LTD., Beijing (CN)

(72) Inventor: Dengfeng Wu, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

(*) Notice: Subject to any disclaimer, the term of this patent is extended or adjusted under 35 U.S.C. 154(b) by 130 days.

(21) Appl. No.: 16/198,047

(22) Filed: Nov. 21, 2018

(65) Prior Publication Data
US 2019/0287552 A1   Sep. 19, 2019

(30) Foreign Application Priority Data
Mar. 14, 2018 (CN) .......................... 201810210251.0

(51) Int. Cl.
*G10L 25/78* (2013.01)
*G10L 15/08* (2006.01)
(Continued)

(52) U.S. Cl.
CPC ............ *G10L 25/78* (2013.01); *G06F 1/3206* (2013.01); *G10L 15/08* (2013.01); *G10L 15/22* (2013.01);
(Continued)

(58) Field of Classification Search
CPC ......... G10L 25/78; G10L 15/08; G10L 15/22; G10L 15/28; G06F 1/3206; H04R 1/406
See application file for complete search history.

(56) References Cited

U.S. PATENT DOCUMENTS

| | | | |
|---|---|---|---|
| 2008/0144876 A1* | 6/2008 | Reining | H04R 1/083 381/369 |
| 2013/0253937 A1* | 9/2013 | Cho | G06F 3/167 704/275 |

(Continued)

FOREIGN PATENT DOCUMENTS

| | | |
|---|---|---|
| CN | 101075434 A | 11/2007 |
| CN | 104715754 A | 6/2015 |

(Continued)

OTHER PUBLICATIONS

Notice of Reasons for Refusal from JP app. No. 2018-219865, dated Dec. 20, 2019, with English translation from Global Dossier.

(Continued)

*Primary Examiner* — Nafiz E Hoque
(74) *Attorney, Agent, or Firm* — Ladas & Parry, LLP (57) ABSTRACT

The present disclosure provides a method, apparatus for implementing a far-field speech function, system and a storage medium, wherein the method comprises: a speech detecting unit located on a smart device performing speech signal detection in real time; upon detecting an awakening word, the speech detecting unit awakening an algorithm unit located on the smart device and being in a standby state; the speech detecting unit transmitting the obtained speech signal to the algorithm unit so that the algorithm unit performs arithmetic processing for the speech signal in a predetermined manner, and sends a processed speech signal to a control system of the smart device, to complete a corresponding control operation. The solution of the present disclosure can be applied to save energy consumption and improve the acoustic effect, break away from the constraints of the remote controller and facilitate the user's operation.

13 Claims, 5 Drawing Sheets

(51) Int. Cl.
*G10L 15/22* (2006.01)
*H04R 1/40* (2006.01)
*G10L 15/28* (2013.01)
*G06F 1/3206* (2019.01)

(52) U.S. Cl.
CPC .............. *G10L 15/28* (2013.01); *H04R 1/406* (2013.01); *G10L 2015/088* (2013.01)

(56) References Cited

U.S. PATENT DOCUMENTS

| | | |
|---|---|---|
| 2015/0039303 A1 | 2/2015 | Lesso et al. |
| 2015/0106085 A1* | 4/2015 | Lindahl .................. G06F 3/167 704/231 |
| 2015/0194152 A1* | 7/2015 | Katuri ..................... G10L 15/30 704/231 |
| 2018/0091913 A1* | 3/2018 | Hartung ................. H04R 27/00 |
| 2019/0281341 A1* | 9/2019 | Lawrence .......... H04N 21/4126 |
| 2020/0302159 A1* | 9/2020 | Yellepeddi ........... G06K 9/0057 |

FOREIGN PATENT DOCUMENTS

| | | |
|---|---|---|
| CN | 105204628 A | 12/2015 |
| CN | 206490785 U | 9/2017 |
| CN | 107358954 A | 11/2017 |
| CN | 107610700 A | 1/2018 |
| CN | 107704275 A | 2/2018 |
| JP | H10312194 | 11/1998 |
| JP | 2004109361 A | 4/2004 |
| JP | 2016126022 A | 7/2016 |
| JP | 2019045576 A | 3/2019 |
| JP | 2019095551 A | 6/2019 |

OTHER PUBLICATIONS

First Office Action and Search Report from CN app. No. 201810210251.0, dated Mar. 4, 2019, with English translation from Global Dossier.
Second Office Action and Supplementary Search Report from CN app. No. 201810210251.0, dated May 30, 2019, with English translation from Global Dossier.

* cited by examiner

METHOD, APPARATUS, SYSTEM AND STORAGE MEDIUM FOR IMPLEMENTING A FAR-FIELD SPEECH FUNCTION

The present application claims the priority of Chinese Patent Application No. 201810210251.0, filed on Mar. 14, 2018, with the title of "Method, apparatus, system and storage medium for implementing a far-field speech function". The disclosure of the above application is incorporated herein by reference in its entirety.

FIELD OF THE DISCLOSURE

The present disclosure relates to computer application technologies, and particularly to a method, apparatus, system and a storage medium for implementing a far-field speech function.

BACKGROUND OF THE DISCLOSURE

Far-field speech function is a function merging Artificial Intelligence (AI) speech search and changing a user's experience, and omits the step of "pressing the remote control speech key". The user only needs to sit in the sofa and speaks out an instruction, and then obtains a corresponding operation feedback. At present, the far-field speech function generally proves valid within a range of 5 meters.

At present, there arise various smart devices having the far-field speech function, for example, smart TV sets, smart loudspeaker boxes and smart watches.

However, it does not go smoothly to implant the far-field speech function into conventional household appliance such as smart TV sets.

The far-field speech recognition needs to be completed by combining a front end and a back end. On the one hand, a microphone array is used at the front end, speech reinforcement is accomplished through sound source positioning and adaptive beamforming, far-field sound pickup is completed at the front end, and influences caused by noise, reverberation and echoing are addressed. On the other hand, it is necessary to, in combination with a background recognition engine, recognize the user's speech into text information, and then convert into an operation instruction to which the smart TV can respond.

The microphone array and corresponding operations such as noise reduction, reverberation removal and echo removal all can be completed in real time with a certain operation capability. Correspondingly, a chip needs to consume certain electrical energy to perform these relevant operations.

In addition, the state has rigid energy efficiency standard grades and corresponding subsidy measures with respect to electronic products. The energy efficiency subsidy for TV-type products is 13% for grade-one energy efficiency, and 8% for grade-two energy efficiency. At present, an average profit of TV sets is lower. Comparatively speaking, the state's energy efficiency subsidy appears particularly important. Hence, it is a requisite pursuit for each TV set to reach the state's energy efficiency standard. With reaching the standard, any other creations and functions cannot be put into practical use in products.

To this end, it is usual, in the prior art, to design the far-field speech function in a TV set top box to avoid the state's energy efficiency grade assessment. However, this manner cannot lower energy consumption and exhibits an undesirable acoustic effect. Specifically, when the microphone array makes echo removal, a sound feedback of the loudspeaker needs to be introduced, sound played by the set top box is output to the smart TV set, and then sent out through the loudspeaker. The feedback duration varies randomly, and the echo removal effect becomes poorer.

Or, it is also possible to mount the microphone on the remote controller, namely, develop a speech remote controller. In this way, the far-field speech function becomes near-field speech interaction, and the user must speak towards the remote controller with stiff posture and clumsy operation. Furthermore, the so doing cannot break away from the remote controller's constraints and contravenes the original intention of speech interaction.

SUMMARY OF THE DISCLOSURE

In view of the above, the present disclosure provides a method for implementing a far-field speech function, apparatus, system and a storage medium, which can save energy consumption and improve the acoustic effect, break away from the constraints of the remote controller and facilitate the user's operation.

Specific technical solutions are as follows:

A method for implementing a far-field speech function, comprising:

a speech detecting unit located on a smart device performing speech signal detection in real time;

upon detecting an awakening word, the speech detecting unit awakening an algorithm unit located on the smart device and being in a standby state;

the speech detecting unit transmitting the obtained speech signal to the algorithm unit so that the algorithm unit performs arithmetic processing for the speech signal in a predetermined manner, and sends a processed speech signal to a control system of the smart device, to complete a corresponding control operation.

According to a preferred embodiment of the present disclosure, the speech detecting unit comprises: a microphone array including at least two microphones.

According to a preferred embodiment of the present disclosure, the speech detecting unit awakening an algorithm unit in a standby state upon detecting an awakening word comprises:

awakening the algorithm unit in the standby state when any microphone in the microphone array detects the awakening word.

According to a preferred embodiment of the present disclosure, the speech detecting unit transmitting the obtained speech signal to the algorithm unit comprises:

the speech detecting unit transparently transmits the obtained speech signal to the algorithm unit.

A method for implementing a far-field speech function, comprising:

an algorithm unit located on a smart device obtaining an awakening signal sent from a speech detecting unit located on the smart device, converting from a standby state into an activated state, the awakening signal being sent to the algorithm unit when the speech detecting unit performs speech signal detection in real time and detects an awakening word;

the algorithm unit obtaining a speech signal sent from the speech detecting unit and obtained by the speech detecting unit;

the algorithm unit performing arithmetic processing for the speech signal in a predetermined manner, and sends a processed speech signal to a control system of the smart device, to complete a corresponding control operation.

According to a preferred embodiment of the present disclosure, the speech detecting unit comprises: a microphone array including at least two microphones.

According to a preferred embodiment of the present disclosure, the algorithm unit obtaining an awakening signal sent from a speech detecting unit, and converting from a standby state into an activated state comprises:

converting from a standby state to an activated state, upon obtaining the awakening signal sent from any microphone in the microphone array after detecting the awakening word.

A speech detecting unit located on a smart device; the speech detecting unit comprises: a detecting module and an awakening module;

the detecting module is configured to perform speech signal detection in real time, and notify the awakening module upon detecting an awakening word;

the awakening module is configured to, upon receiving a notification from the detecting module, awaken an algorithm unit located on the smart device and being in a standby state;

the detecting module is further configured to transmit the obtained speech signal to the algorithm unit so that the algorithm unit performs arithmetic processing for the speech signal in a predetermined manner, and sends a processed speech signal to a control system of the smart device, to complete a corresponding control operation.

According to a preferred embodiment of the present disclosure, the speech detecting unit comprises: at least two microphones;

each microphone comprises the detecting module and the awakening module.

According to a preferred embodiment of the present disclosure, the detecting module transparently transmits the obtained speech signal to the algorithm unit.

An algorithm unit located on a smart device; the algorithm unit comprises: a state converting module and a signal processing module;

the state converting module is configured to obtain an awakening signal sent from a speech detecting unit located on the smart device, convert the algorithm unit from a standby state into an activated state, the awakening signal being sent to the algorithm unit when the speech detecting unit performs speech signal detection in real time and detects an awakening word;

the signal processing module is configured to obtain a speech signal sent from the speech detecting unit and obtained by the speech detecting unit, perform arithmetic processing for the speech signal in a predetermined manner, and send a processed speech signal to a control system of the smart device, to complete a corresponding control operation.

According to a preferred embodiment of the present disclosure, the speech detecting unit comprises: a microphone array including at least two microphones.

According to a preferred embodiment of the present disclosure, upon obtaining the awakening signal sent from any microphone in the microphone array after detecting the awakening word, the state converting module converts the algorithm unit from a standby state to an activated state.

A system for implementing a far-field speech function, comprising:

the above-mentioned speech detecting unit, and the above-mentioned algorithm unit.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, according to solutions of the present disclosure, the far-field speech function is implemented on the smart device such as smart TV, thereby overcoming problems such as undesirable acoustic effect caused by designing the far-field speech function in the set top box in the prior art. Furthermore, the speech detecting unit performs speech signal detection, and awakens the algorithm unit only upon detecting the awakening word, otherwise the algorithm unit is in the standby state, thereby saving energy consumption. Furthermore, the remote controller needn't be used in the solutions of the present disclosure, so that the constraints of the remote controller are broken and the user's operation is facilitated.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
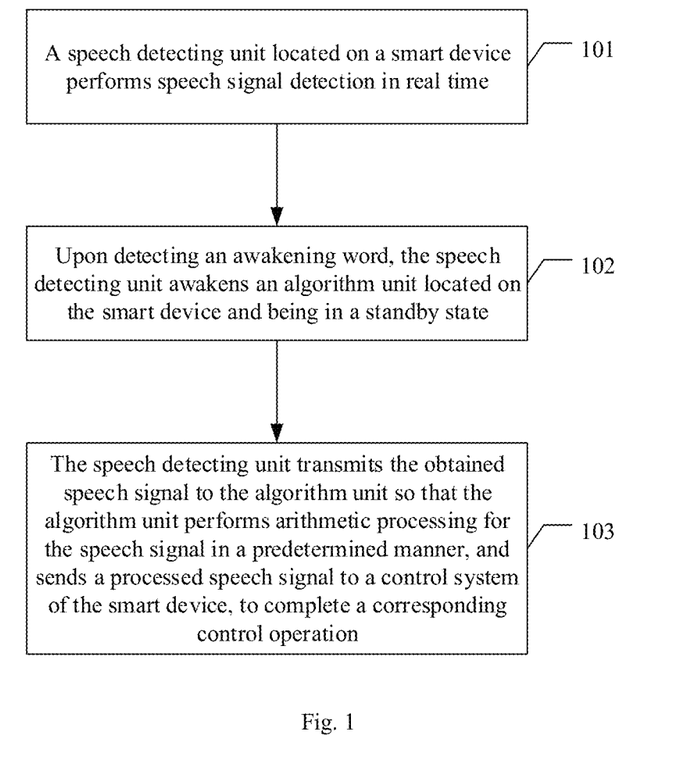
FIG. 1 is a flow chart of a first embodiment of a method for implementing a far-field speech function according to the present disclosure.

FIG. 1 is a flow chart of a first embodiment of a method for implementing a far-field speech function according to the present disclosure. As shown in FIG. 1, the embodiment comprises the following specific implementation mode.

At 101, a speech detecting unit located on a smart device performs speech signal detection in real time.

At 102, upon detecting an awakening word, the speech detecting unit awakens an algorithm unit located on the smart device and being in a standby state.

At 103, the speech detecting unit transmits the obtained speech signal to the algorithm unit so that the algorithm unit performs arithmetic processing for the obtained speech signal in a predetermined manner, and sends a processed speech signal to a control system of the smart device, to complete a corresponding control operation.

In the present embodiment, it is possible to set the speech detecting unit having the awakening function and the algorithm unit on the smart device.

The speech detecting unit may detect the speech signal within a working range in real time, namely, perform speech signal collection in real time, and upon detecting an awakening word, the speech detecting unit awakens the algorithm unit which is in a standby state. The awakening word may be preset by the user.

Figure 2:
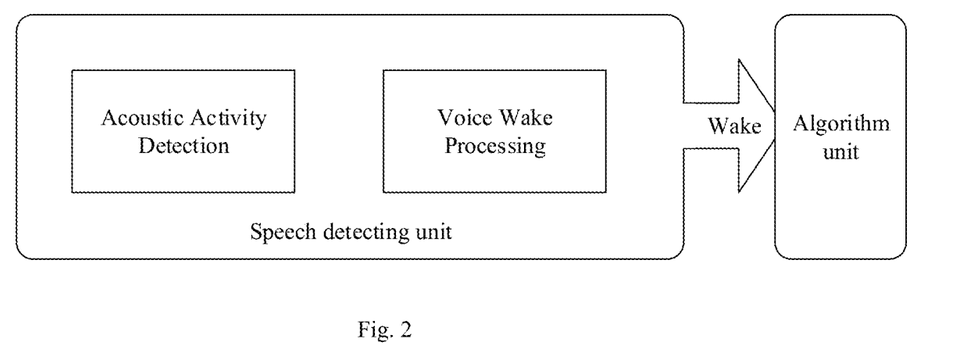
FIG. 2 is a schematic diagram of a manner of awakening an algorithm unit according to the present disclosure.

As shown in FIG. 2, FIG. 2 is a schematic diagram of a manner of awakening the algorithm unit according to the present disclosure. The speech detecting unit performs acoustic activity detection in real time, namely, detects the speech signal within a working range, and once detecting the awakening word, the speech detecting unit performs speech awakening processing and awakens the algorithm unit in the standby state.

After the algorithm unit is awakened, i.e., is converted from a standby state to an activated state, the speech detecting unit transmits the obtained (collected) speech signal to the algorithm unit. Correspondingly, the algorithm unit may perform arithmetic processing for the obtained speech signal in a predetermined manner, including echo removal, reverberation removal and sound source positioning, finally obtain a clear speech signal, and transmit the speech signal to the control system of the smart device.

The control system of the smart device uploads the obtained speech signal to the cloud so that the cloud performs speech recognition for the obtained speech signal, generates a corresponding operation instruction according to a speech recognition result, and returns the operation instruction to the control system of the smart device. The control system of the smart device completes a corresponding control operation according to the operation instruction.

Preferably, the speech detecting unit may be a microphone unit having an awakening function and low power consumption. The low power consumption means that the power consumption of the microphone unit is very low. Such microphone may be used to achieve the purpose of saving power consumption.

In addition, the microphone unit may be a microphone array at least including two microphones. A plurality of microphones may be used to improve a collection sensitivity of the microphone unit for the speech signal. For example, it is possible to set a microphone at a left position, a middle position and a right position below a screen of the smart device respectively. As such, no matter whether the user is at the middle position, left position or right position of the smart device, the speech signal sent by the user may be better collected.

When any microphone in the microphone array detects the awakening word, it may awaken the algorithm unit in the standby state. Specifically, upon detecting the awakening word, any microphone may send an awakening signal (interrupt signal) to the algorithm unit to activate the algorithm unit to perform operation functions such as echo removal, reverberation removal and sound source positioning.

Figure 3:
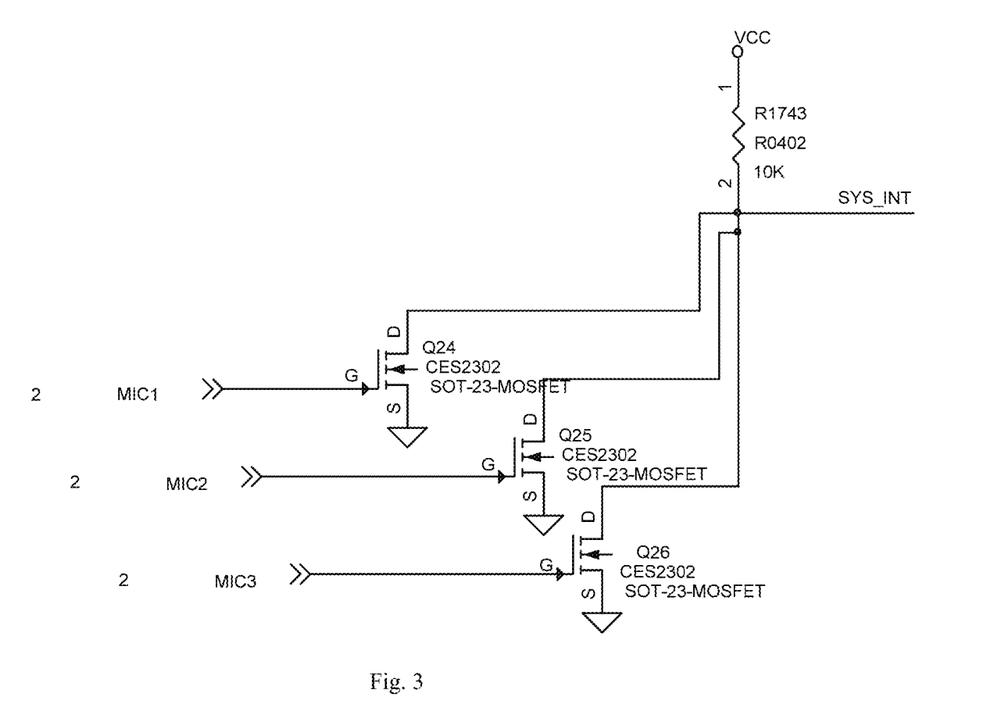
FIG. 3 is a schematic diagram of a distributed wired-AND architecture according to the present disclosure.

A distributed wired-AND architecture may be employed between the microphone array and the algorithm unit. FIG. 3 is a schematic diagram of a distributed wired-AND architecture according to the present disclosure. As shown in FIG. 3, assuming that the microphone array includes a total of three microphones, MIC1, MIC2 and MIC3 respectively, and any microphone detects the awakening word, it sends an awakening signal, for example a high voltage, to pull down a SYS_INT signal and thereby awakens the algorithm unit.

Figure 4:
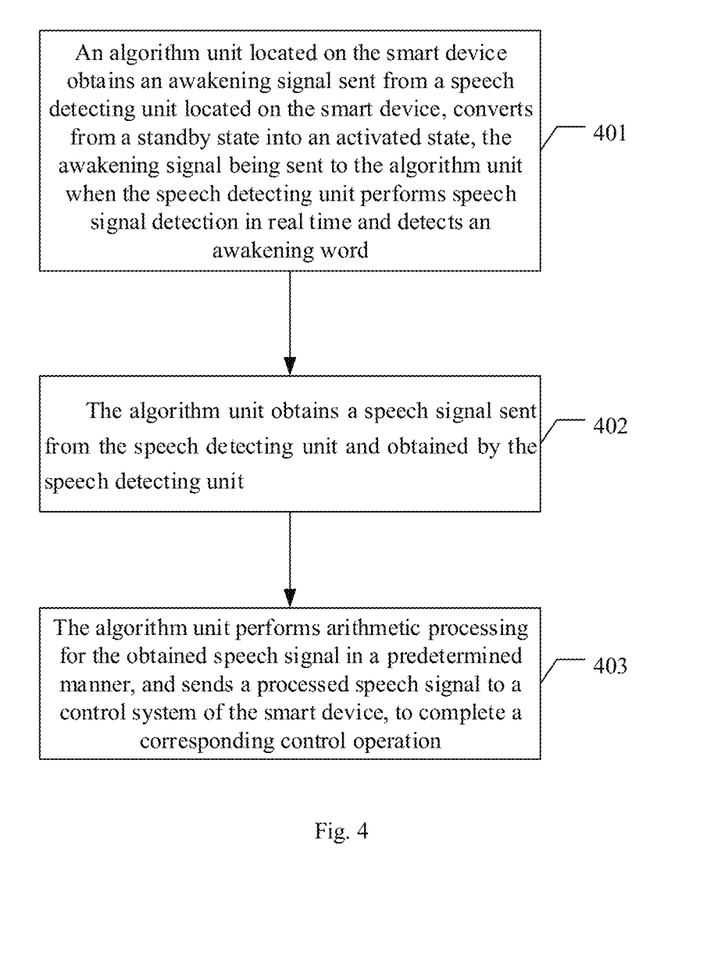
FIG. 4 is a flow chart of a second embodiment of a method for implementing a far-field speech function according to the present disclosure.

FIG. 4 is a flow chart of a second embodiment of a method for implementing a far-field speech function according to the present disclosure. As shown in FIG. 4, the embodiment comprises the following specific implementation mode.

At 401, an algorithm unit located on the smart device obtains an awakening signal sent from a speech detecting unit located on the smart device, converts from a standby state into an activated state, the awakening signal being sent to the algorithm unit when the speech detecting unit performs speech signal detection in real time and detects an awakening word.

At 402, the algorithm unit obtains a speech signal sent from the speech detecting unit and obtained by the speech detecting unit.

At 403, the algorithm unit performs arithmetic processing for the obtained speech signal in a predetermined manner, and sends a processed speech signal to a control system of the smart device, to complete a corresponding control operation.

In the present embodiment, it is possible to set the speech detecting unit having the awakening function and the algorithm unit on the smart device.

The speech detecting unit may detect the speech signal within a working range in real time, namely, perform speech signal collection in real time, and upon detecting an awakening word, the speech detecting unit awakens the algorithm unit which is in a standby state. The awakening word may be preset by the user.

After the algorithm unit is awakened, i.e., is converted from a standby state to an activated state, the speech detecting unit transmits the obtained (collected) speech signal to the algorithm unit. Correspondingly, the algorithm unit may perform arithmetic processing for the obtained speech signal in a predetermined manner, including echo removal, reverberation removal and sound source positioning, finally obtains a clear speech signal, and transmits the speech signal to the control system of the smart device.

The control system of the smart device uploads the obtained speech signal to the cloud so that the cloud performs speech recognition for the obtained speech signal, generates a corresponding operation instruction according to a speech recognition result, and returns the operation instruction to the control system of the smart device. The control system of the smart device completes a corresponding control operation according to the operation instruction.

Preferably, the speech detecting unit may be a microphone array at least including two microphones to improve a sensitivity of the speech detecting unit. Corresponding, upon obtaining the awakening signal sent from any microphone in the microphone array after detecting the awakening word, the algorithm unit converts from a standby state to an activated state.

The smart device in the above embodiments may be a smart household electrical appliance such as a smart TV set. The solution of the present disclosure will be further described by taking the smart TV set as an example.

Figure 5:
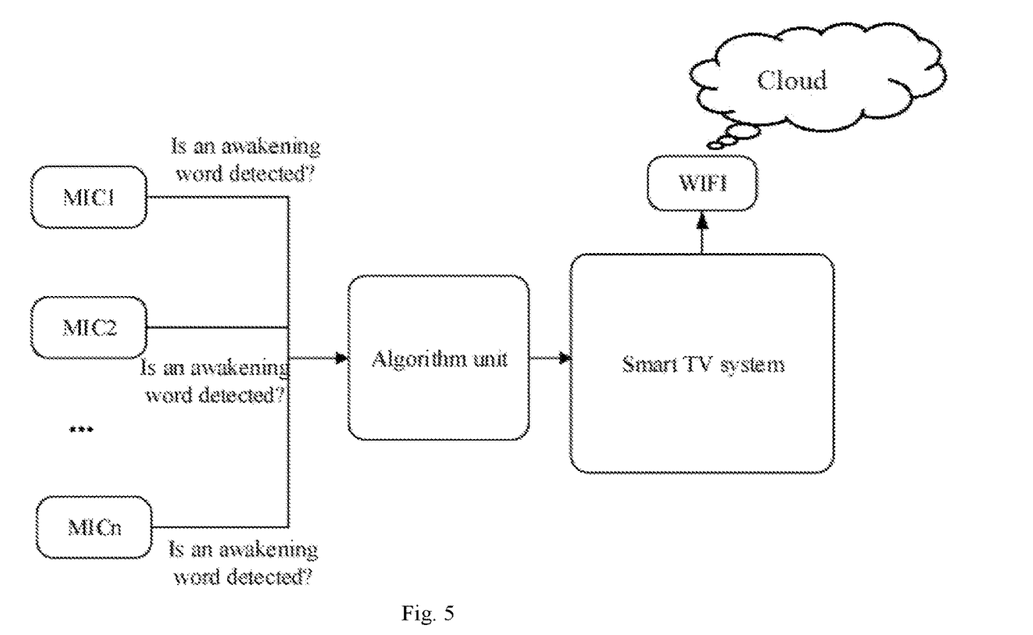
FIG. 5 is a schematic diagram of a mode of implementing the far-field speech function on the smart TV set according to the present disclosure.

FIG. 5 is a schematic diagram of a mode of implementing the far-field speech function on the smart TV set according to the present disclosure.

As shown in FIG. 5, microphones (MIC) in the microphone array respectively detect the speech signal within a working range in real time.

If any microphone detects the awakening word, it awakens the algorithm unit so that the algorithm unit converts from a standby state to an activated state.

Microphones transparently transmit the obtained speech signal to the algorithm unit. Specifically, when the algorithm unit is in the activated state, the microphones may transparently transmit the obtained speech signal to the algorithm unit. The awakening word may or may not be transmitted to the algorithm unit.

The algorithm unit may perform arithmetic processing for the obtained speech signal, including echo removal, reverberation removal and sound source positioning, finally generates a clear speech signal, and transmits the speech signal to the control system of the smart TV, or called a smart TV system.

The smart TV system uploads the obtained speech signal to the cloud so that the cloud performs speech recognition for the obtained speech signal, generates a corresponding operation instruction according to a speech recognition result, and returns the operation instruction to the smart TV system.

The smart TV system executes the operation instruction returned by the cloud, and completes the corresponding control operation.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

To sum up, according to the solutions of the above method embodiments, the far-field speech function is implemented on the smart device such as smart TV, thereby overcoming problems such as undesirable acoustic effect caused by designing the far-field speech function in the set top box in the prior art. Furthermore, the speech detecting unit performs speech signal detection, and awakens the algorithm unit only upon detecting the awakening word, otherwise the algorithm unit is in the standby state, thereby saving energy consumption. Furthermore, the remote controller needn't be used in the solutions of the above method embodiments, so that the constraints of the remote controller are broken and the user's operation is facilitated.

The above introduces the method embodiments. The solution of the present disclosure will be further described through an apparatus embodiment.

Figure 6:
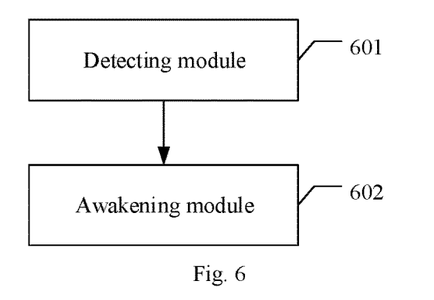
FIG. 6 is a structural schematic diagram of components of an embodiment of a speech detecting unit according to the present disclosure.

FIG. 6 is a structural schematic diagram of components of an embodiment of a speech detecting unit according to the present disclosure. The speech detection unit may be located on the smart device. As shown in FIG. 6, the speech detecting unit may include: a detecting module 601 and an awakening module 602.

The detecting module 601 is configured to perform speech signal detection in real time, and notify the awakening module 602 upon detecting an awakening word.

The awakening module 602 is configured to, upon receiving the notification from the detecting module 601, awaken an algorithm unit located on a smart device and being in a standby state.

The detecting module 601 may be further configured to transmit the obtained speech signal to the algorithm unit 602 so that the algorithm unit 602 performs arithmetic processing for the speech signal in a predetermined manner, and sends a processed speech signal to a control system of the smart device, to complete a corresponding control operation.

The detecting module 601 detects the speech signal within a working range in real time, namely, performs speech signal collection in real time, and if the awakening word is detected, the awakening module 602 awakens the algorithm unit which is in a standby state.

After the algorithm unit is awakened, i.e., is converted from a standby state to an activated state, the detecting module 601 transparently transmits the obtained (collected) speech signal to the algorithm unit. Correspondingly, the algorithm unit may perform arithmetic processing for the obtained speech signal in a predetermined manner, including echo removal, reverberation removal and sound source positioning, finally obtain a clear speech signal, and transmit the speech signal to the control system of the smart device.

The control system of the smart device uploads the obtained speech signal to the cloud so that the cloud performs speech recognition for the obtained speech signal, generates a corresponding operation instruction according to a speech recognition result, and returns the operation instruction to the control system of the smart device. The control system of the smart device completes a corresponding control operation according to the operation instruction.

Preferably, to improve sensitivity, the speech detecting unit may at least include two microphones, each microphone including the detecting module 601 and the awakening module 602. The microphones are not shown to simplify the figure.

When the detecting module 601 in any microphone detects the awakening word, the awakening module 602 may awaken the algorithm unit in the standby state.

Figure 7:
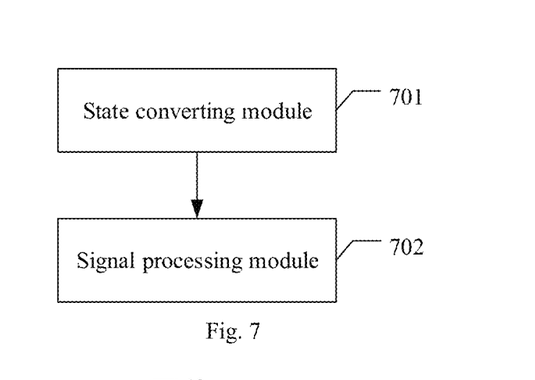
FIG. 7 is a structural schematic diagram of components of an embodiment of an algorithm unit according to the present disclosure.

FIG. 7 is a structural schematic diagram of components of an embodiment of an algorithm unit according to the present disclosure. The algorithm unit is located on the smart device. As shown in FIG. 7, the algorithm unit may include: a state converting module 701 and a signal processing module 702.

The state converting module 701 is configured to obtain an awakening signal sent from a speech detecting unit located on a smart device, convert the algorithm unit from a standby state into an activated state, the awakening signal being sent to the algorithm unit when the speech detecting unit performs speech signal detection in real time and detects an awakening word.

The signal processing module 702 is configured to obtain a speech signal sent from the speech detecting unit and obtained by the speech detecting unit, perform arithmetic processing for the speech signal in a predetermined manner, and send a processed speech signal to a control system of the smart device, to complete a corresponding control operation.

Preferably, the speech detecting unit may be a microphone array at least including two microphones to improve sensitivity of the speech detecting unit. Correspondingly, upon obtaining the awakening signal sent from any microphone in the microphone array after detecting the awakening word, the state converting module 701 converts the algorithm unit from a standby state to an activated state.

The present disclosure meanwhile discloses a system for implementing a far-field speech function, comprising the speech detecting unit as shown in FIG. 6, and the algorithm unit shown in FIG. 7.

Reference may be made to corresponding depictions in the aforesaid method embodiment for a specific workflow of the apparatus and system embodiments. The workflow is not detailed any more.

To sum up, according to the solutions of the above apparatus and system embodiments, the far-field speech function is implemented on the smart device such as smart TV, thereby overcoming problems such as undesirable acoustic effect caused by designing the far-field speech function in the set top box in the prior art. Furthermore, the speech detecting unit performs speech signal detection, and awakens the algorithm unit only upon detecting the awakening word, otherwise the algorithm unit is in the standby state, thereby saving energy consumption. Furthermore, the remote controller needn't be used in the solutions of the above apparatus and system embodiments, so that the constraints of the remote controller are broken and the user's operation is facilitated.

Figure 8:
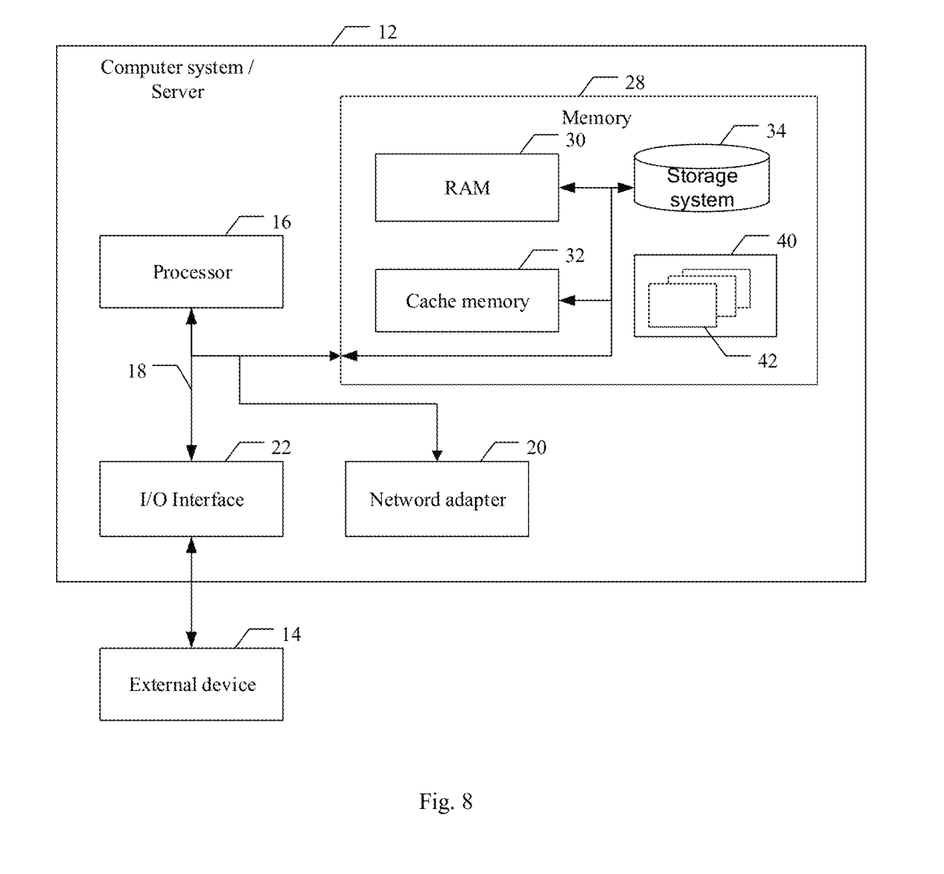
FIG. 8 illustrates a block diagram of an example computer system/server 12 adapted to implement an implementation mode of the present disclosure.

FIG. 8 illustrates a block diagram of an example computer system/server 12 adapted to implement an implementation mode of the present disclosure. The computer system/server 12 shown in FIG. 8 is only an example and should not bring about any limitation to the function and scope of use of the embodiments of the present disclosure.

As shown in FIG. 8, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 8 and typically called a "hard drive"). Although not shown in FIG. 8, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 8, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1 or FIG. 4.

The present disclosure meanwhile provides a computer-readable storage medium on which a computer program is stored, the program, when executed by the processor, implementing the method stated in embodiment shown in FIG. 1 or FIG. 4.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for implementing a far-field speech function for a smart TV, wherein the method comprises:
 a speech detecting unit including a microphone array located on the smart TV performing speech signal detection in real time; wherein the microphone array comprises a plurality of microphones each having an awakening function;
 upon detecting an awakening word by a microphone of the microphone array, the microphone awakening an algorithm unit located on the smart TV and being in a standby state; wherein the plurality of microphones are connected to the algorithm unit with a distributed wired AND gate architecture;
 the speech detecting unit transmitting the obtained speech signal to the algorithm unit so that the algorithm unit performs arithmetic processing for the speech signal in a predetermined manner including echo removal, reverberation removal and sound source positioning, and sends a processed speech signal to a control system of the smart TV, to complete a corresponding control operation.

2. The method according to claim 1, wherein
 the microphone of the speech detecting unit awakening an algorithm unit in a standby state upon detecting an awakening word comprises:
 awakening the algorithm unit in the standby state when one or more microphones in the microphone array detects the awakening word.

3. The method according to claim 1, wherein
 the speech detecting unit transmitting the obtained speech signal to the algorithm unit comprises:
 the speech detecting unit transparently transmits the obtained speech signal to the algorithm unit.

4. A method for implementing a far-field speech function for a smart TV, wherein the method comprises:
 an algorithm unit located on the smart TV obtaining an awakening signal sent from a microphone of a microphone array comprising a plurality of microphones each having an awakening function included in a speech detecting unit located on the smart TV, converting from a standby state into an activated state, the awakening signal being sent to the algorithm unit when the speech detecting unit performs speech signal detection in real time and detects an awakening word; wherein the plurality of microphones are connected to the algorithm unit with a distributed wired AND gate architecture;
 the algorithm unit obtaining a speech signal sent from the speech detecting unit and obtained by the speech detecting unit;
 the algorithm unit performing arithmetic processing for the speech signal in a predetermined manner including echo removal, reverberation removal and sound source positioning, and sends a processed speech signal to a control system of the smart TV, to complete a corresponding control operation.

5. The method according to claim 4, wherein
 the algorithm unit obtaining an awakening signal sent from the speech detecting unit, and converting from a standby state into an activated state comprises:
 converting from a standby state to an activated state, upon obtaining the awakening signal sent from one or more microphones in the microphone array after detecting the awakening word.

6. A speech detecting unit of a smart TV, comprising:
 a memory;
 a microphone array comprising a plurality of microphones each having an awakening function;
 a processor; and
 a computer program which is stored on the memory and runs on the processor,
 wherein the processor, upon executing the program, implements a method for implementing a far-field speech function, wherein the method comprises:
 performing speech signal detection in real time with the microphone array;

upon detecting an awakening word by a microphone of the microphone array, the microphone awakening an algorithm unit in a standby state; wherein the plurality of microphones are connected to the algorithm unit with a distributed wired AND gate architecture;

transmitting the obtained speech signal to the algorithm unit so that the algorithm unit performs arithmetic processing for the speech signal in a predetermined manner including echo removal, reverberation removal and sound source positioning, and sends a processed speech signal to a control system of the smart TV, to complete a corresponding control operation.

7. The speech detecting unit according to claim 6, wherein the awakening an algorithm unit in a standby state upon detecting an awakening word comprises:

awakening the algorithm unit in the standby state when one or more microphones in the microphone array detects the awakening word.

8. The speech detecting unit according to claim 6, wherein the speech detecting unit transmitting the obtained speech signal to the algorithm unit comprises:

the speech detecting unit transparently transmits the obtained speech signal to the algorithm unit.

9. An algorithm unit of a smart TV, comprising:
a memory;
a processor; and
a computer program which is stored on the memory and runs on the processor, wherein the processor, upon executing the program, implements a method for implementing a far-field speech function, wherein the method comprises:

obtaining an awakening signal sent from a microphone of a microphone array comprising a plurality of microphones each having an awakening function included in a speech detecting unit, converting from a standby state into an activated state, the awakening signal being sent to the algorithm unit when the speech detecting unit performs speech signal detection in real time and detects an awakening word; wherein the plurality of microphones are connected to the algorithm unit with a distributed wired AND gate architecture;

obtaining a speech signal sent from the speech detecting unit and obtained by the speech detecting unit;

performing arithmetic processing for the speech signal in a predetermined manner including echo removal, reverberation removal and sound source positioning, and sends a processed speech signal to a control system of the smart TV, to complete a corresponding control operation.

10. The algorithm unit according to claim 9, wherein the algorithm unit obtaining an awakening signal sent from the speech detecting unit, and converting from a standby state into an activated state comprises:

converting from a standby state to an activated state, upon obtaining the awakening signal sent from one or more microphones in the microphone array after detecting the awakening word.

11. A system for implementing a far-field speech function for a smart TV, wherein the system comprises:

a speech detecting unit comprising a first memory, a microphone array comprising a plurality of microphones each having an awakening function, a first processor and a first computer program which is stored on the first memory and runs on the first processor, wherein the first processor, upon executing the first program, implements a first method for implementing a far-field speech function, wherein the first method comprises:

performing speech signal detection in real time;

upon detecting an awakening word by a microphone of the microphone array, the microphone awakening an algorithm unit in a standby state; wherein the plurality of microphones are connected to the algorithm unit with a distributed wired AND gate architecture;

transmitting the obtained speech signal to the algorithm unit so that the algorithm unit performs arithmetic processing for the speech signal in a predetermined manner including echo removal, reverberation removal and sound source positioning, and sends a processed speech signal to a control system of the smart TV, to complete a corresponding control operation; and the algorithm unit comprising a second memory, a second processor and a second computer program which is stored on the second memory and runs on the second processor, wherein the second processor, upon executing the second program, implements a second method for implementing a far-field speech function, wherein the second method comprises:

obtaining an awakening signal sent from the microphone of the speech detecting unit, converting from the standby state into the activated state, the awakening signal being sent to the algorithm unit when the speech detecting unit performs speech signal detection in real time and detects the awakening word;

obtaining the speech signal sent from the speech detecting unit and obtained by the speech detecting unit;

performing arithmetic processing for the speech signal in a predetermined manner, and sends the processed speech signal to the control system of the smart TV, to complete the corresponding control operation.

12. A non-transitory computer-readable storage medium on which a computer program is stored, wherein the program, when executed by a processor, implements a method for implementing a far-field speech function for a smart TV, wherein the method comprises:

a speech detecting unit including a microphone array on the smart TV performing speech signal detection in real time; wherein the microphone array comprises a plurality of microphones each having an awakening function;

upon detecting an awakening word by a microphone of the microphone array, the microphone awakening an algorithm unit located on the smart TV and being in a standby state; wherein the plurality of microphones are connected to the algorithm unit with a distributed wired AND gate architecture;

the speech detecting unit transmitting the obtained speech signal to the algorithm unit so that the algorithm unit performs arithmetic processing for the speech signal in a predetermined manner including echo removal, reverberation removal and sound source positioning, and sends a processed speech signal to a control system of the smart TV, to complete a corresponding control operation.

13. A non-transitory computer-readable storage medium on which a computer program is stored, wherein the program, when executed by a processor, implements a method for implementing a far-field speech function of a smart TV, wherein the method comprises:

an algorithm unit located on the smart TV obtaining an awakening signal sent from a microphone of a microphone array comprising a plurality of microphones each having an awakening function included in a speech detecting unit located on the smart TV, converting from a standby state into an activated state, the awakening signal being sent to the algorithm unit when the speech detecting unit performs speech signal detection in real time and detects an awakening word; wherein the plurality of microphones are connected to the algorithm unit with a distributed wired AND gate architecture;

the algorithm unit obtaining a speech signal sent from the speech detecting unit and obtained by the speech detecting unit;

the algorithm unit performing arithmetic processing for the speech signal in a predetermined manner including echo removal, reverberation removal and sound source positioning, and sends a processed speech signal to a control system of the smart TV, to complete a corresponding control operation.

* * * * *